United States Patent
Robba et al.

[15] 3,697,721
[45] Oct. 10, 1972

[54] PYROLYTIC GRAPHITE NOZZLES AND GUIDE TUBES FOR WELDING TORCHES

[72] Inventors: William A. Robba, Shoreham; George A. Klasson, Port Washington, both of N.Y.

[73] Assignees: Air Products and Chemicals, Inc., Allentown, Pa.; Pfizer, Inc., New York, N.Y.

[22] Filed: Jan. 8, 1971

[21] Appl. No.: 105,040

[52] U.S. Cl. ............................................. 219/136
[51] Int. Cl. ............................................. B23k 9/00
[58] Field of Search ............ 219/130, 136; 23/209.1

[56] References Cited

UNITED STATES PATENTS

| | | |
|---|---|---|
| 3,536,888 | 10/1970 | Borneman ............... 219/130 |
| 1,300,117 | 4/1919 | Cadwell .................. 219/136 |
| 2,735,920 | 2/1956 | Valliere .................. 219/130 |
| 3,366,774 | 1/1968 | Nuss et al. ............. 219/136 X |
| 3,431,390 | 3/1969 | Manz ...................... 219/130 |

*Primary Examiner*—C. L. Albritton
*Attorney*—Connolly and Hutz

[57] ABSTRACT

The removable nozzle for a gas-shielded welding torch is surfaced with pyrolytic graphite to prolong nozzle life and to render the inner surface thereof less adherent to weld splatter thereby facilitating cleaning. The pyrolytic graphite is oriented with a-b planes concentric with the nozzle axis. The surfacing may be accomplished by securing an insert of appropriately oriented pyrolytic graphite within the exit end of the nozzle. A removable wire guide tube having an outer surface of oriented pyrolytic graphite is also optionally provided.

6 Claims, 5 Drawing Figures

PATENTED OCT 10 1972 3,697,721
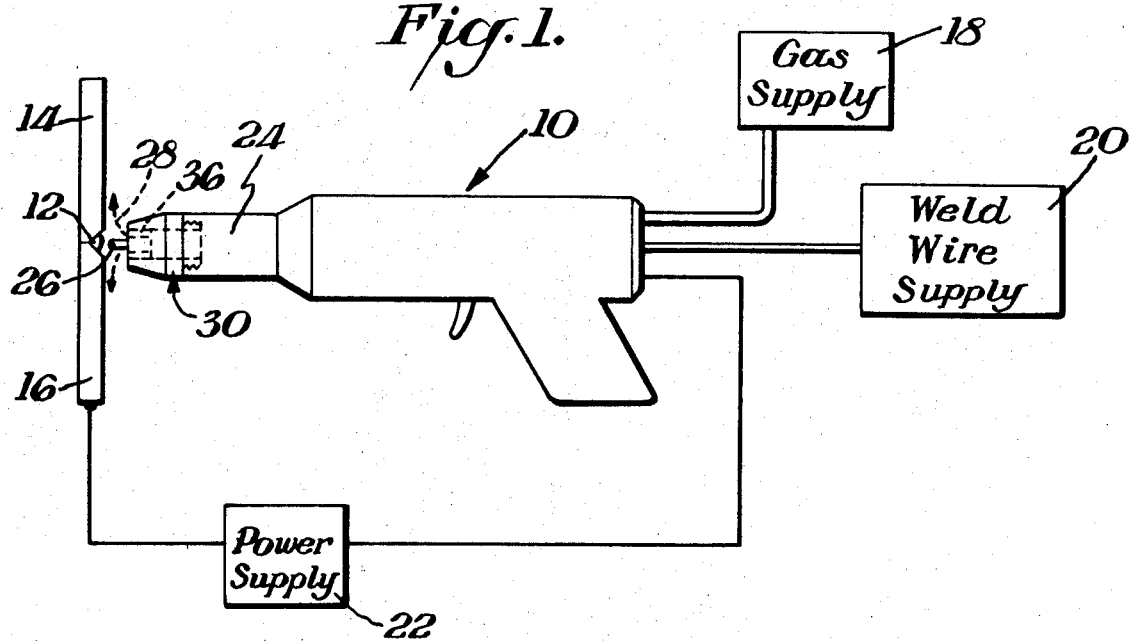
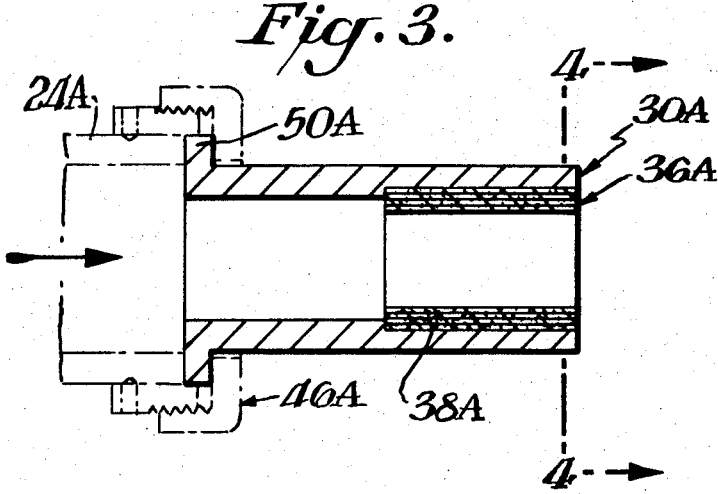
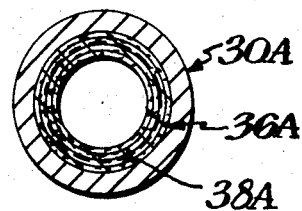
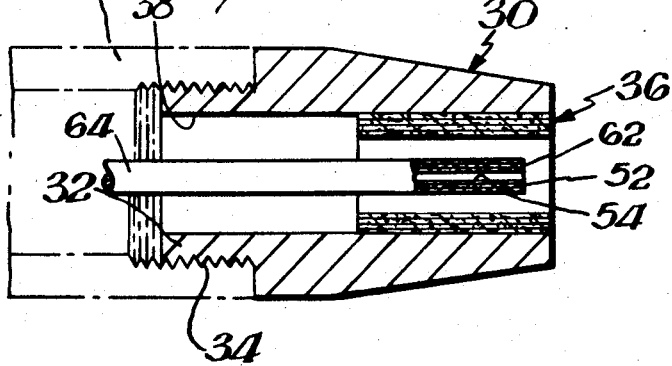
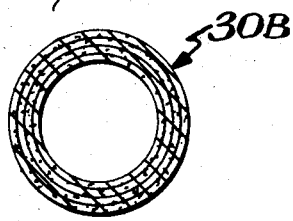

PYROLYTIC GRAPHITE NOZZLES AND GUIDE TUBES FOR WELDING TORCHES

BACKGROUND OF THE INVENTION

This invention relates to the removable nozzle for the nose of a gas-shielded arc welding torch. A gas such as $CO_2$, helium, argon, or a mixture thereof is passed through and out the nozzle of the torch to shield the weld from contamination by impurities from the surrounding atmosphere. The inner wall of the nozzle is splattered with welding material, which in a relatively short period of time (e.g. about 1 hour of average use) must be cleaned. This weld splatter problem and the extremely high temperatures attained during welding (about 6,000–12,000°F.) limit the useful life of a typical nozzle used today in commercial welding torches. The life of a nozzle varies with operating conditions; under average conditions being about 40 hours; while under severe conditions the nozzle requires replacement in a relatively shorter time. Similar weld splatter problems are encountered with respect to the outer surface of the wire guide tubes in welding torches which reduce the useful life (e.g. about 4 hours under average use) of the tubes. This invention provides a surface of pyrolytic graphite within the tip of the nozzle, and optionally on the outer surface of a wire guide tube as well, which makes it considerably less adherent to weld splatter. Further, it provides a nozzle and guide tube having a much longer useful life. As a result of the reduced adherence of weld splatter, much less effort and time are required to clean the pyrolytic graphite surface.

SUMMARY OF THE INVENTION

The removable nozzle for a gas-shielded welding torch is internally surfaced with pyrolytic graphite having the $a–b$ planes concentric to the nozzle axis. This enhances the nozzle life and renders the inner nozzle surface less adherent to splatter, thereby facilitating cleaning. The provision of such a surface may be conveniently accomplished by mounting a tubular insert of pyrolytic graphite within the exit end of the nozzle, or by manufacturing the entire nozzle of oriented pyrolytic graphite. Similarly, the nozzle is optionally provided with a wire guide tube having an outer surface of concentrically oriented pyrolytic graphite.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which:

FIG. 1 is a schematic diagram of a gas-shielded welding torch with associated apparatus and work, said torch having a removable nozzle in which an embodiment of this invention is employed;

FIG. 2 is a longitudinal cross-sectional view of the front portion of the torch shown in FIG. 1;

FIG. 3 is a longitudinal cross-sectional view of the front portion of another gas-shielded welding torch incorporating a nozzle employing another embodiment of this invention;

FIG. 4 is a cross-sectional view taken through FIG. 3 along the line 4—4; and

FIG. 5 is a cross-sectional view of a nozzle representing an alternate embodiment of the invention.

DESCRIPTION OF THE PREFERRED EMBODIMENTS

As is known, pyrolytic graphite is a highly anisotropic substance by virtue of its oriented crystalline structure, which comprises a series of parallel layers or planes which are commonly designated the "$a–b$ planes". The direction normal to the $a–b$ planes is commonly designated the "$c$-axis" or "$c$-direction". Thermal conductivity of pyrolytic graphite is many times greater within the $a–b$ planes than in the $c$-direction perpendicular to those planes. The lower adherence to weld splatter achieved by using surfaces composed of oriented pyrolytic graphite gives rise to two important results. First, a substantial proportion of the weld splatter is prevented from sticking to the surface at all. Secondly, that amount of weld splatter which actually does adhere to the surface of a nozzle or guide tube is much easier to remove because it does not become firmly bonded to the pyrolytic graphite as it does in the case of other surfaces (e.g. copper).

As shown in FIGS. 1 and 2, a gas-shielded arc welding torch 10 is being used to form a weld 12 between steel plates 14 and 16. Torch 10 is connected to gas supply 18, which is for example, a source of a shielding gas such as argon or $CO_2$ and to a source of weld metal or wire supply 20 which is for example a reel of steel welding wire. A power supply 22 which may be of the AC or DC type is connected between torch 10 and work pieces 14 and 16. Torch 10 has a nose or heat sink 24 within which is longitudinally disposed the metal electrode 26 which is a consumable wire fed from wire supply 20. A shielding gas designated by arrows 28 flows through nose 24 about the consumable metal electrode 26 to shield it from the atmosphere.

Nose 24 incorporates a removable nozzle 30, which is shown in detail in FIG. 2. Nozzle 30 is removably mounted within nose 24 by threaded boss 32 screwed within internally threaded end 34 of nose 24. Nozzle 30 is removable to facilitate replacement, and a number of nozzles are provided to permit them to be replaced. Guide tube 52 having central bore 54, inner end 64 and outer end 62 being disposed within the inner and outer ends of nozzle 30, is concentrically disposed within nozzle 30 and is mounted within nose 24 in the customary manner (e.g. by threaded or collet chuck attachment). Guide tube 52 is provided for the purpose of supporting and supplying current to weld wire 26. Since guide tube 52, like nozzle 30, is subject to weld splatter, it is advantageously formed of pyrolytic graphite with the $a–b$ planes thereof oriented concentric with the axis of said tube. Alternatively, guide tube 52 may for example be formed of metal, e.g. copper, having an outer surface, e.g. sheath or coating, of pyrolytic graphite for the same purpose. Guide tube 52 is removable to facilitate replacement and a number of guide tubes 52 are provided to permit them to be replaced.

The system described in FIG. 1 includes a carbon dioxide gas-shielded torches as well as the MIG type of welding system, which stands for 'metal inert gas'. This invention is also applicable to the other types of gas-shielded welding systems such as TIG (tungsten inert gas), submerged arc welding devices, etc.

The outer end of nozzle 30, shown in FIG. 2, is internally surfaced with pyrolytic graphite by tubular insert 36. As indicated schematically by parallel horizontal lines, insert 36 has the pyrolytic graphite $a$–$b$ planes oriented concentric with the axis of said insert, so that heat is conducted along the $a$–$b$ planes through nozzle 30 and into heat sink 24 from which it is dissipated. Insert 36 is mounted within the end of nozzle or supporting tube 30 by press or interference fit. This interference fit is for example conveniently accomplished by press and shrink fitting. Nozzle or supporting tube 30, which is for example made of copper, is heated to about 600°C. and insert 36 is pressed within it. When nozzle 30 cools, a strong interference fit is achieved. Any other dependable means of attachement such as clamping, swaging, staking, brazing or high temperature cementing may be utilized. Entire nozzle 30 may be made of the same pyrolytic graphite material as insert 36 (as shown in FIG. 5) but more rugged and economical nozzles are made in the inserted form here described.

Tubular insert 36 is for example made in the following manner in order to achieve a structure wherein the pyrolytic graphite $a$–$b$ planes are oriented concentric to the axis of said insert.

A pyrolytic graphite tube is deposited on a polycrystalline graphite rod (e.g. one-half inch diameter × 12 inches long) in a vacuum furnace. Deposition conditions are 6 liters per minute natural gas, 6 liters per minute hydrogen, temperature of 2,100°C. and absolute pressure of 13 mm Hg. The inner rod is removed and the outer tube is then machined to 0.625 inches OD and cut into 0.700 inch length inserts.

One of these cut off lengths was pressed as an insert into a copper sleeve as previously described and mounted on a gas shielded metal-arc welding gun. The gun ran at 250 amps using 25 CFM $CO_2$ and 0.030 inch medium carbon steel welding wire. The nozzle with insert was run for 80 hours with only minimal wear. It was cleaned of splatter once every 8 hours. The standard copper nozzle is usually worn out under average use after 40 hours and must be cleaned every hour. Wire guide tube 52 is made by similar deposition techniques to achieve a structure having pyrolytic graphite $a$–$b$ planes oriented concentric to the axis of said tube. Again, the tube is rendered less adherent to weld splatter and its life (e.g. about 4 hours) is prolonged similarly. Typically, the guide tube dimensions are about one thirty-seconds inch I.D. × 3–4 inches length; the tube O.D. being about three-sixteenths to one-fourth inch.

In FIGS. 3 and 4 is shown an insert 36A made of pyrolytic graphite, press-fitted within counterbore 38A in nozzle 30A. As indicated schematically by parallel horizontal lines in FIG. 3 and by concentric circles in FIG. 4, insert has the pyrolytic graphite $a$–$b$ planes oriented concentric with the axis of said insert. Nozzle 30A, which optionally carries integrally and externally case flange 50A at the inner end of nozzle 30A, is mounted to nose 24A by a collect chuck 46A which retains nozzle 30A by compressing external flange 50A.

Further embodiments of the invention will be apparent to those skilled in the art. For example, the nozzle for an arc torch may be comprised of oriented pyrolytic graphite, without the use of an insert, as provided in FIG. 5. Therein is shown pyrolytic graphite having the $a$–$b$ planes oriented concentric with the axis of said nozzle, as indicated schematically by concentric circles. Nozzle 30B may optionally by provided with a wire guide tube having an outer surface of oriented pyrolytic graphite as discussed hereinbefore. Pyrolytic graphite is obtained by the chemical vapor deposition of graphite at temperatures above about 2,000°C. This provides a highly oriented and anisotropic pyrolytic graphite, which is planar crystalline and has highly anisotropic properties. For example, the thermal conductivity within its oriented planes is about 200 times greater than the thermal conductivity normal to the planes of orientation. Pyrolytic graphite and processes to obtain it are described in U.S. Pat. No. 3,375,308. See particularly the portions beginning Col. 2, line 59 and Col. 3, line 36. Another patent describing the pyrolytic graphite utilized in this invention is U.S. Pat. No. 3,410,746. Of course, the term tubular as employed herein and in the appended claims, is meant to include conical configurations, as well as cylindrical.

What is claimed is:

1. A tubular insert for a gas-shielded welding torch having an electrode longitudinally disposed within a tubular gas-conducting nozzle, said tubular insert comprising pyrolytic graphite, said pyrolytic graphite a-b planes oriented concentric with the axis of said tubular insert, whereby said insert is resistant to the heat of welding and to the adherence of weld splatter and whereby buildup of splatter is reduced and removal of said weld splatter from said nozzle is facilitated.

2. A nozzle for a gas-shielded welding torch comprising the insert set forth in claim 1, and a supporting tube of heat resistant material, said insert being mounted within said supporting tube.

3. A nozzle as set forth in claim 2 wherein said supporting tube has entrance and exit ends and a counterbore within the exit end, and said insert is mounted within said counterbore.

4. A tubular nozzle for a gas-shielded welding torch comprising pyrolytic graphite having the $a$–$b$ planes oriented concentric with the axis of said tubular nozzle.

5. The nozzle of claim 2 in combination with a wire guide tube concentrically mounted within said nozzle, said guide tube having an outer surface of pyrolytic graphite with the $a$–$b$ planes thereof oriented concentric with the axis of said wire guide tube.

6. The tubular nozzle of claim 4 in combination with a wire guide tube concentrically mounted within said tubular nozzle, said wire guide tube having an outer surface of pyrolytic graphite with the $a$–$b$ planes thereof oriented concentric with the axis of said wire guide tube.

* * * * *